US009306840B2

(12) United States Patent
Puttaswamy Naga et al.

(10) Patent No.: US 9,306,840 B2
(45) Date of Patent: Apr. 5, 2016

(54) SECURING SOFTWARE DEFINED NETWORKS VIA FLOW DEFLECTION

(71) Applicants: Krishna P. Puttaswamy Naga, Edison, NJ (US); Fang Hao, Morganville, NJ (US); T. V. Lakshman, Morganville, NJ (US)

(72) Inventors: Krishna P. Puttaswamy Naga, Edison, NJ (US); Fang Hao, Morganville, NJ (US); T. V. Lakshman, Morganville, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 446 days.

(21) Appl. No.: 13/627,003

(22) Filed: Sep. 26, 2012

(65) Prior Publication Data

US 2014/0089506 A1    Mar. 27, 2014

(51) Int. Cl.
  *G06F 15/173*  (2006.01)
  *H04L 12/717*  (2013.01)
  *H04L 29/06*   (2006.01)
  *H04L 12/715*  (2013.01)
  *H04L 12/743*  (2013.01)

(52) U.S. Cl.
  CPC .............. *H04L 45/42* (2013.01); *H04L 45/64* (2013.01); *H04L 63/1458* (2013.01); *H04L 45/7457* (2013.01)

(58) Field of Classification Search
  USPC ......... 709/201, 202, 223, 224, 225, 226, 238, 709/239, 240, 241, 242, 243, 244, 245; 370/229, 235, 252, 352, 389, 392, 399, 370/401
  See application file for complete search history.

(56) References Cited

U.S. PATENT DOCUMENTS

| 7,002,965 | B1 * | 2/2006 | Cheriton ................. 370/395.32 |
| 7,028,098 | B2 * | 4/2006 | Mate et al. ..................... 709/238 |
| 7,356,033 | B2 * | 4/2008 | Basu et al. ..................... 370/392 |
| 7,573,889 | B1 * | 8/2009 | Milliken et al. .............. 370/399 |
| 7,602,787 | B2 * | 10/2009 | Cheriton ....................... 370/392 |
| 8,014,390 | B2 * | 9/2011 | Kalkunte et al. ............. 370/389 |
| 8,054,744 | B1 * | 11/2011 | Bishara et al. ............... 370/229 |
| 8,089,961 | B2 * | 1/2012 | Sahni et al. ................... 370/389 |
| 8,250,175 | B2 * | 8/2012 | Ma ................................ 709/218 |
| 8,300,525 | B1 * | 10/2012 | Kohn et al. .................... 370/230 |

(Continued)

FOREIGN PATENT DOCUMENTS

| EP | 1 137 228 A1 | 9/2001 |
| WO | WO 94/26042 A1 | 11/1994 |

OTHER PUBLICATIONS

International Search Report and Written Opinion for International Patent Application Serial No. PCT/US2013/059574, mailed Dec. 5, 2013, consists of 9 unnumbered pages.

*Primary Examiner* — Saket K Daftuar
(74) *Attorney, Agent, or Firm* — Tong, Rea, Bentley & Kim, LLP (57) ABSTRACT

A flow deflection capability is provided for deflecting data flows within a Software Defined Network (SDN) in order to provide security for the SDN. A flow forwarding rule is generated for a first network element of the SDN based on detection of a condition (e.g., TCAM utilization condition, CPU utilization condition, or the like) associated with the first network element. The flow forwarding rule is generated by a control element of the SDN or the first network element of the SDN. The flow forwarding rule is indicative that at least a portion of new flow requests received at the first network element are to be forwarded from the first network element to a second network element of the SDN. The flow forwarding rule may specify full flow deflection or selective flow deflection.

20 Claims, 4 Drawing Sheets

(56) References Cited

U.S. PATENT DOCUMENTS

| | | | |
|---|---|---|---|
| 8,582,428 B1 * | 11/2013 | Bishara et al. | 370/229 |
| 8,644,308 B2 * | 2/2014 | Park et al. | 370/389 |
| 8,693,344 B1 * | 4/2014 | Adams et al. | 370/241 |
| 8,725,873 B1 * | 5/2014 | Bromberg | 709/225 |
| 2003/0056001 A1 * | 3/2003 | Mate et al. | 709/238 |
| 2004/0100950 A1 * | 5/2004 | Basu et al. | 370/389 |
| 2007/0171911 A1 * | 7/2007 | Ku | 370/392 |
| 2010/0074125 A1 * | 3/2010 | Chandra et al. | 370/252 |
| 2011/0149776 A1 * | 6/2011 | Park et al. | 370/252 |
| 2011/0255540 A1 * | 10/2011 | Mizrahi et al. | 370/392 |
| 2013/0272305 A1 * | 10/2013 | Lefebvre et al. | 370/392 |

* cited by examiner

SECURING SOFTWARE DEFINED NETWORKS VIA FLOW DEFLECTION

TECHNICAL FIELD

The disclosure relates generally to communication networks and, more specifically but not exclusively, to providing security in Software Defined Networks (SDNs).

BACKGROUND

A Software Defined Network (SDN) is a type of computer network in which the control plane is separated from the data plane. In general, in a SDN, the data plane is implemented using forwarding elements (e.g., switches, routers, or the like) and the control plane is implemented using one or more control elements (e.g., servers or the like) which are separate from the forwarding elements.

SUMMARY OF EMBODIMENTS

Various deficiencies in the prior art are addressed by embodiments for providing security in a Software Defined Network (SDN).

In one embodiment, an apparatus includes a processor and a memory communicatively connected to the processor, where the processor is configured to generate, based on detection of a resource utilization condition at the first network element of the SDN, a flow forwarding rule indicative that at least a portion of new flow requests received at the first network element of the SDN are to be forwarded from the first network element of the SDN to a second network element of the SDN.

In one embodiment, a method includes using a processor for generating, based on detection of a resource utilization condition at the first network element of the SDN, a flow forwarding rule indicative that at least a portion of new flow requests received at the first network element of the SDN are to be forwarded from the first network element of the SDN to a second network element of the SDN.

In one embodiment, an apparatus includes a processor and a memory communicatively connected to the processor, where the processor is configured to receive a new flow request at a first network element of the SDN and forward the new flow request from the first network element toward a second network of the SDN based on a flow forwarding rule indicative that at least a portion of new flow requests received at the first network element are to be forwarded from the first network element to the second network element.

In one embodiment, a method includes using a processor for receiving a new flow request at a first network element of the SDN and forwarding the new flow request from the first network element toward a second network of the SDN based on a flow forwarding rule indicative that at least a portion of new flow requests received at the first network element are to be forwarded from the first network element to the second network element.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF EMBODIMENTS

In general, a flow deflection capability is provided for deflecting data flows within a Software Defined Network (SDN) in order to provide security for the SDN.

Figure 1:
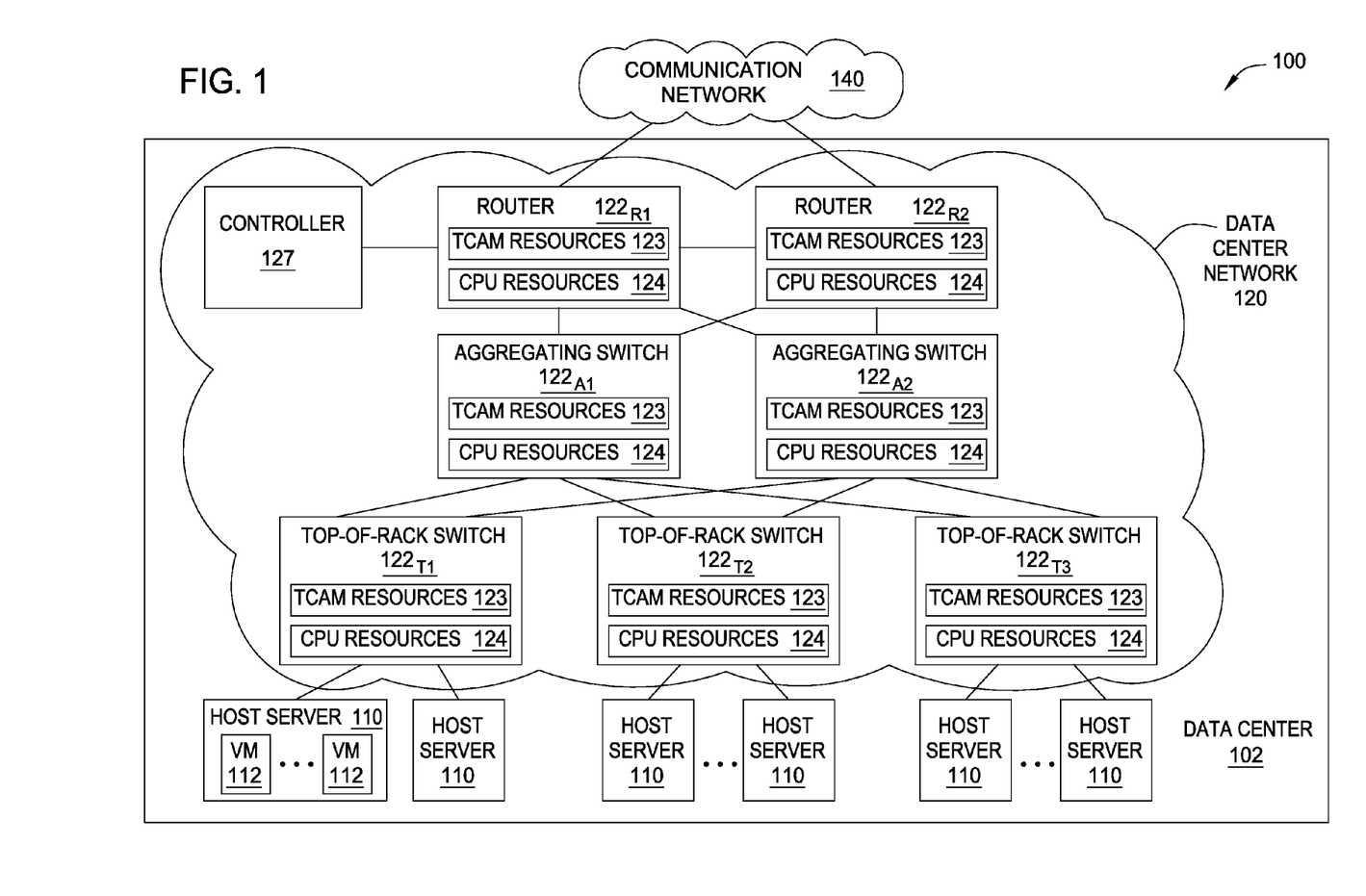
FIG. 1 depicts a high-level block diagram of a data center environment including a data center network implemented as a Software Defined Network (SDN)

FIG. 1 depicts a high-level block diagram of a data center environment including a data center network implemented as a Software Defined Network (SDN).

As depicted in FIG. 1, data center environment 100 includes a data center 102. The data center 102 includes a plurality of host servers 110 (collectively, host servers 110) and a data center network 120.

The host servers 110 are configured to support respective pluralities of Virtual Machines (VMs) 112. It will be appreciated that each host server 110 may include one or more server blades where each server blade may include one or more Central Processing Units (CPUs).

The data center network 120 is configured to support communications of data center environment 100 (e.g., between VMs 112 of host servers 110 within data center environment 100, between VMs 112 of host servers 110 and devices located outside of data center environment 100, or the like, as well as various combinations thereof).

The data center network 120 includes a plurality of network elements 122 and a controller 127. The network elements 122 include three of top-of-rack (ToR) switches $122_{T1}$-$122_{T3}$ (collectively, ToR switches $122_T$), a pair of aggregating switches $122_{A1}$-$122_{A2}$ (collectively, aggregating switches $122_A$), and a pair of routers $122_{R1}$-$122_{R2}$ (collectively, routers $122_R$). As depicted in FIG. 1, host servers 110 are communicatively connected to the ToR switches $122_T$ (with each host server 110 being connected to an associated one of the ToR switches $122_T$ such that each ToR switch $122_T$ supports multiple host servers 110 and each host server 110 is supported by one of the ToR switches $122_T$), each of the ToR switches $122_T$ is communicatively connected to both of the aggregating switches $122_A$, and each of the aggregating switches $122_A$ is communicatively connected to both of the routers $122_R$. The controller 127 is communicatively connected to each of the network elements 122 via one of the routers $122_R$. As further depicted in FIG. 1, each router $122_R$ is communicatively connected to a communication network 140 (e.g., a public data network such as the Internet, a private data network, or the like). It will be appreciated that data center network 120 is merely exemplary, and that various other types of data center networks 120 may be supported (e.g., including fewer or more ToR switches $122_T$, fewer or more aggregating switches $122_A$, fewer or more routers $122_R$, fewer or more layers of network elements 122, different arrangements of network elements 120, or the like, as well as various combinations thereof.

The data center network 120 is implemented as an SDN. In general, an SDN provides a capability to program the network elements of a network via a centralized controller (illustratively, to program the network elements 122 of data center network 120 via controller 127). This type of flexibility simplifies various tasks, such as managing and updating the network, controlling the placement of flows within the network, and so forth. It will be appreciated that such advantages may be beneficial for large-scale data centers. For example, SDNs may be used for planning migrations of large data sets within data centers.

In data center network 120, the network elements 122 are configured to operate as the forwarding elements of the SDN and the controller 127 is configured to operate as the control element of the SDN. In other words, the network elements 122 provide a data plane of the SDN for propagating data within the data center network 120 and the controller 127 provides a control plane of the SDN for controlling propagation of data within the data center network 120. In a typical SDN, a network element 122 forwards a request for a new data flow to the controller 127, the controller 127 computes a data path for the new data flow, the controller 127 provide data path information indicative of the computed data path to the network elements 122 that will support the data flow, and the network elements 122 that will support the data flow receive the data path information from the controller 127 and use the data path information to forward data of the data flow according to the computed data path of the data flow. In this manner, the controller 127 controls the data paths of data flows within the SDN.

In data center network 120, the network elements 122 and controller 127 are configured to communicate using a control protocol of the SDN (e.g., for enabling network elements 122 to request computation of data paths for data flows, for enabling controller 127 to provide data path information for data flows to network elements 122, or the like). In at least some embodiments, the control protocol that is used in data center network 120 is the OpenFlow protocol.

In general, OpenFlow provides fine-grained control of the network by offloading the path setup decision of the data flows from the network elements to the central controller (illustratively, providing fine-grained control of data center network 120 by offloading the path setup decision of the data flows from the network elements 122 to the controller 127). The controller 127 is configured to identify the optimal data path for a given data flow based on global knowledge of the SDN (illustratively, based on global knowledge of the data center network 120). In OpenFlow, a first network element 122 of the SDN that receives a new flow request sends the new flow request to the controller 127, and the controller 127 determines a data path for the data flow within the data center network 120 and provisions the data path within the data center network 120 by programming the network elements 122 with forwarding rules configured for use by the network elements 122 to forward packets of the data flow according to the data path determined for the data flow. The new flow request may be in the form of the first packet of the data flow, a data flow request message, or the like. For example, for a data flow originating from one of the VMs 112 of one of the host servers 110 of data center 102, the ToR switch $122_T$ with which the one of the host servers 110 is associated is the first network element to receive the new flow request for the data flow and (when flow deflection is not being used) forwards the new flow request for the data flow to the controller 127. For example, for a data flow originating from a device outside of data center 102 and intended for one of the VMs 110 of one of the host servers 110 of the data center 102, the router $122_R$ which is the entry point to the data center network 120 is the first network element to receive the new flow request for the data flow and (when flow deflection is not being used) forwards the new flow request for the data flow to the controller 127.

As a result, in OpenFlow, the control plane overhead is dependent on the number of data flows within the SDN. Thus, while the use of OpenFlow to provide the control plane of the SDN enables fine-grained control on data flows of the SDN, the control plane of OpenFlow, including the associated resources used to provide the control plane of Open Flow, may become highly utilized and, thus, may be vulnerable to a new class of attacks. This is in comparison to traditional networks in which the control plane overhead is independent of the number of data flows, at least because (1) the control plane is distributed on the network elements, which are responsible for maintaining topology information, computing the data paths, and maintaining the forwarding table, and (2) packets of a data flow are forwarded through the network by stitching together a data path for the data flow based on pre-computed entries.

In OpenFlow, the controller 127 and the network elements 122 perform data path setup for data flows and the network elements 122 support the data flows. For a given data flow, (1) the controller 127 determines a data path for the data flow, computes forwarding rules to be provided to network elements 122 in the data path determined for the data flow, and propagates the forwarding rules to the network elements 122 in the data path determined for the data flow, and (2) the network elements 122 in the data path determined for the data flow receive the forwarding rules, store the forwarding rules in forwarding tables, and access the forwarding rules to forward packets of the data flow according to the data path determined for the data flow. As a result, support by a network element 122 for a data flow consumes resources of the network element 122.

The resources of a network element 122 that are typically used to support data flows are memory resources and processor resources. The memory and processor resources of a network element 122 are used for functions such as performing data path setup for data flows, maintaining flow state for data flows, or the like. The memory resources of a network element 122 typically include a Content-Addressable Memory (CAM) of the network element 122 and, more specifically, Ternary CAM (TCAM) of the network element 122, which is used to maintain the forwarding table for the network element 122 (e.g., using a data flow entry for each data flow supported by the network element 122). The processor resources of a network element 122 typically include resources of a CPU of the network element. These types of resources are depicted in FIG. 1 as the TCAM resources 123 and CPU resources 124 of each of the network elements 122, respectively.

The memory resources and processor resources of a network element 122 that are typically used to support data flows (namely, TCAM resources 123 and CPU resources 124, respectively) are typically limited in capacity at the network element 122 (e.g., due to the relatively high costs of TCAM resources and CPU resources). For example, the maximum capacity of an existing TCAM of a network element is typically approximately 36 Mbits, which can accommodate approximately 64K to 128K data flow entries. Similarly, for example, the maximum data rate of an existing CPU of a network element is typically approximately 17 Mbps, which is multiple orders of magnitude smaller than the data rates of the data flows. Thus, the memory resources and processor resources of the network elements 122 of data center network 120 are expected to be quite limited.

In data center network 120, the limited resources of the network elements 122 can be exploited in various types of malicious attacks which may be directed against the data center network 120. For example, the limited resources of a network element 122 can be exploited in order to perform a resource utilization attack in which a particular type of resource of the network element 122 is over utilized (e.g., pushed above a threshold utilization level) such that the network element 122 may be incapable of efficiently accepting new data flows from legitimate clients or in which a particular type of resource of the network element 122 is exhausted such that the network element 122 is incapable of accepting new data flows from legitimate clients.

In general, by exploiting the amount of work (and resources) involved in setting up a new data path for a new data flow within data center network 120 using OpenFlow, VMs 112 within the data center network 120 or hosts outside of the data center network 120 can attack the data center network 120 via malicious traffic generated by the VMs 112 or the hosts outside of the data center network 120. In general, the malicious traffic in such attacks does not attempt to exhaust the network bandwidth or server resources; rather, the malicious traffic may include the new flow requests (e.g., first packets of data flows) destined to VMs 112 within the data center environment 100 (which may include benign or malicious VMs 112). It will be appreciated that, for each malicious data flow initiated in this manner, the data flow will consume TCAM resources 123 and CPU resources 124 on the first network element 122 that receives the new flow request of the data flow, because the first network element 122 moves the new flow request from the data plane to the control plane, forwards the new flow request to the controller 127, receives data path information for the data path from the controller 127 (based on computation of the data path for the data flow by the controller 127), and installs an associated forwarding entry in the forwarding table maintained in the TCAM resources 123 of the first network element 122). In addition to consuming TCAM resources 123 and CPU resources 124 of the first network element 122, each malicious data flow also consumes some TCAM resources 123 and some CPU resources 124 in each of the other network elements 122 which form the data path for the data flow (e.g., for network element 122 on the data path from the first network element 122 to the associated destination of the data flow). In this manner, malicious data flows can over-utilize or even exhaust the TCAM resources 123 of a network element 122 (thereby causing a TCAM resource condition/attack on the network element 122) or can over-utilize or even exhaust the CPU resources 124 of a network element 122 (thereby causing a CPU resource condition/attack on the network element 122). It will be appreciated that TCAM resources 123 of a network element 122 are expected to be more "sticky" than CPU resources 124 of a network element 122 and, thus, that a TCAM-based attack on a network element 122 is expected to be potentially more severe than a CPU-based attack on a network element 122. It also will be appreciated that there is an inherent tension between the TCAM resources 123 and CPU resources 124 within a given network element 122 (e.g., reducing timeout values for flows leads to more available TCAM entries, but increases the CPU load since more flows need to be forwarded to the controller 127). It also will be appreciated that a TCAM exhaustion attack on a network element 122 may facilitate a CPU exhaustion attack on the network element 122, because once the TCAM resources 123 of the network element 122 are exhausted subsequent new data flows may be processed within software on the network element 122, thereby consuming additional CPU resources 124 of the network element 122 which may lead to exhaustion of the CPU resources 124 of the network element 122.

The limited TCAM resources 123 of a network element 122 can be exploited in order to perform a TCAM exhaustion attack. In a TCAM exhaustion attack, the goal is to fully consume the TCAM resources 123 of a network element 122 such that the network element 122 is incapable of accepting new data flows from legitimate clients. For example, a compromised or malicious VM 112 within data center environment 100 can launch a TCAM exhaustion attack in which the TCAM resources 123 of a network element 122 of the data center network 120 are fully consumed such that the network element 122 is incapable of accepting new data flows from legitimate clients. In some data centers, for example, a malicious VM can overwhelm a switch by simply pinging all of the other VMs within the data center. For example, in a reasonably sized data center having 10K hosts, where each host can host ten or more VMs, a ping from one of the VMs to each of the other VMs of the data center can potentially consume all of the TCAM resources in the network element that is upstream of the malicious VM, thereby causing a TCAM exhaustion condition in the network element that is upstream of the malicious VM. Similarly, for example, even for a data center in which communication to arbitrary ports is limited, simply pinging common ports can potentially consume all of the TCAM resources in the network element that is upstream of the malicious VM, thereby causing a TCAM exhaustion condition in the network element. It will be appreciated that a TCAM exhaustion attack is similar to a Distributed Denial of Service (DDoS) attack, although the TCAM exhaustion attack is a new type of attack against a new type of resource not known to be previously exploited due its indirect involvement in path setup (as opposed to its direct involvement in OpenFlow). Although primarily described with respect to TCAM exhaustion attacks, it will be appreciated that the limited TCAM resources 123 of a network element 122 can be exploited in order to perform a TCAM over-utilization attack or that an attempted TCAM exhaustion attack may result in a TCAM over-utilization condition, such that over-utilization of the TCAM resources 123 of the network element 122 may have detrimental effects on the data center network 120.

The limited CPU resources 124 of a network element 122 can be exploited in order to perform a CPU exhaustion attack. In a CPU exhaustion attack, the goal is to fully consume the CPU resources 124 of a network element 122 such that the network element 122 is incapable of accepting new data flows from legitimate clients. For example, a compromised or malicious VM within a data center can launch a CPU exhaustion attack in which the VM sends a relatively small but constant flood of new flow request messages to a target network element, such that the network element is incapable of accepting new data flows from legitimate clients. Although primarily described with respect to CPU exhaustion attacks, it will be appreciated that the limited CPU resources 124 of a network element 122 can be exploited in order to perform a CPU over-utilization attack or that an attempted CPU exhaustion attack may result in a CPU over-utilization condition, such that over-utilization of the CPU resources 124 of the network element 122 may have detrimental effects on the data center network 120.

Additionally, there also are other types of attacks which may result in one or both of TCAM exhaustion (or TCAM over-utilization) and CPU exhaustion (or CPU over-utilization). For example, when a private data center does not have the "default off" firewall on the VMs, it is easier for a malicious VM of the data center to ping all other VMs, connect to open ports, send traffic, or take other actions which may result in one or both of TCAM exhaustion and CPU exhaustion. For example, even when "default off" firewalls are used on VMs, a malicious VM can simply connect to generally open ports (e.g., port 80 and port 443). For example, traffic originating from outside of the data center also can lead to the type of attacks discussed above, especially at the core switches of the data center or at points where external traffic is routed to individual tenants. For example, a malicious source outside of a data center can generate, from outside of the data center, traffic that causes data flows within the data center to be spread out to some or all of the VMs in the data center (which is similar to connecting to popular ports, but from outside of the data center).

It will be appreciated that such resource-based attacks may be initiated from inside the data center environment 100 (e.g., by a compromised VM 112 of the data center environment 100 that is used as a proxy by a malicious entity to attack the data center network 120, by a VM 112 of the data center environment 100 that is actively and maliciously trying to attack the data center network 120, or the like) or from outside the data center environment 100 (e.g., by a compromised host outside the data center environment 100 that is used as a proxy by a malicious entity to attack the data center network 120, by a host outside the data center environment 100 that is actively and maliciously trying to attack the data center network 120, or the like). It also will be appreciated that an attacker can make the attack more powerful by considering various features of the data center environment 100 (e.g., the topology of the data center network 120, the nature of the traffic generated by applications of the data center environment 100, or the like). Furthermore, based on analysis of existing data centers (e.g., analyzing data center topologies, analyzing data center workloads, approximating data flows that different network elements need to support in commonly used data center topologies, or the like), it has been determined that (1) even normal traffic conditions can lead to resource exhaustion due to relatively large variations in the number of new data flows per unit time, (2) an attacker, by tuning the attack to the workload of the data center, can launch such resource exhaustion attacks with relatively low overhead, and (3) data center topologies with densely-connected core switches, which are involved in a relatively large number of data flows as compared to other types of switches, are particularly vulnerable to such resource exhaustion attacks. Additionally, it will be appreciated that certain legitimate activities associated with a data center may, at least at first, appear to be attacks on the data center (e.g., such as where an application generates a large amount of data flows in a relatively short period of time).

In analyzing potential types of resource-based attacks which may be initiated against an SDN, it was assumed that (1) the controller is secure, scalable, and operating correctly and (2) the connections between the controller and the network elements (e.g., Secure Socket Layer (SSL) connections or other types of connections), which are used as control channels for communication between the controller and the network elements (e.g., for monitoring resource utilization levels, installing rules on the network elements, or the like), are secure. It will be appreciated that one or more of these assumptions may be relaxed or ignored and flow deflection still may be used to alleviate the effects of resource-based attacks.

It will be appreciated that, for DDoS attacks, deterrents are typically designed to handle attacks on network bandwidth or server resources. For example, network bandwidth defense typically relies on mechanisms such as capabilities, fair queuing on routers, rate limiting, and selective dropping of packets. For example, server resource defense typically relies on mechanisms such as capabilities, limiting state, and allocating state after connection completion. However, such defenses are not expected to be able to deter resource-based attacks on TCAM resources and CPU resources in OpenFlow, because they are primarily focused on containing the volume of traffic rather than the number of flows. For example, fair queuing may limit the bandwidth of attack flows, but this will not limit the number of flows. Additionally, while certain defense mechanisms may at least partially help protect against resource exhaustion attacks in certain situations, the defense mechanisms may not provide any protection against resource exhaustion attacks in other situations. For example, the controller can impose a limit on the number of flows that can be initiated from a MAC address or IP address and set a rule to drop any new data flows at the network element if such limit is violated. This may indeed help if the attacks are initiated from inside the data center, since the controller knows the identity of each host and, thus, can track the activity of each host and prevent spoofing; however, for attacks from outside of the data center, the attacker can spoof source addresses and, thus, render such defenses ineffective. Similarly, for capability-based approaches, given that deployment of defense mechanisms outside of the data center is difficult, the attacker can spoof capability-requesting flows and flood the TCAM resources of the network elements of the data center. Furthermore, it is expected that rejection of new data flows may be used when flow deflection is not sufficient to protect against resource exhaustion attacks.

Figure 2:
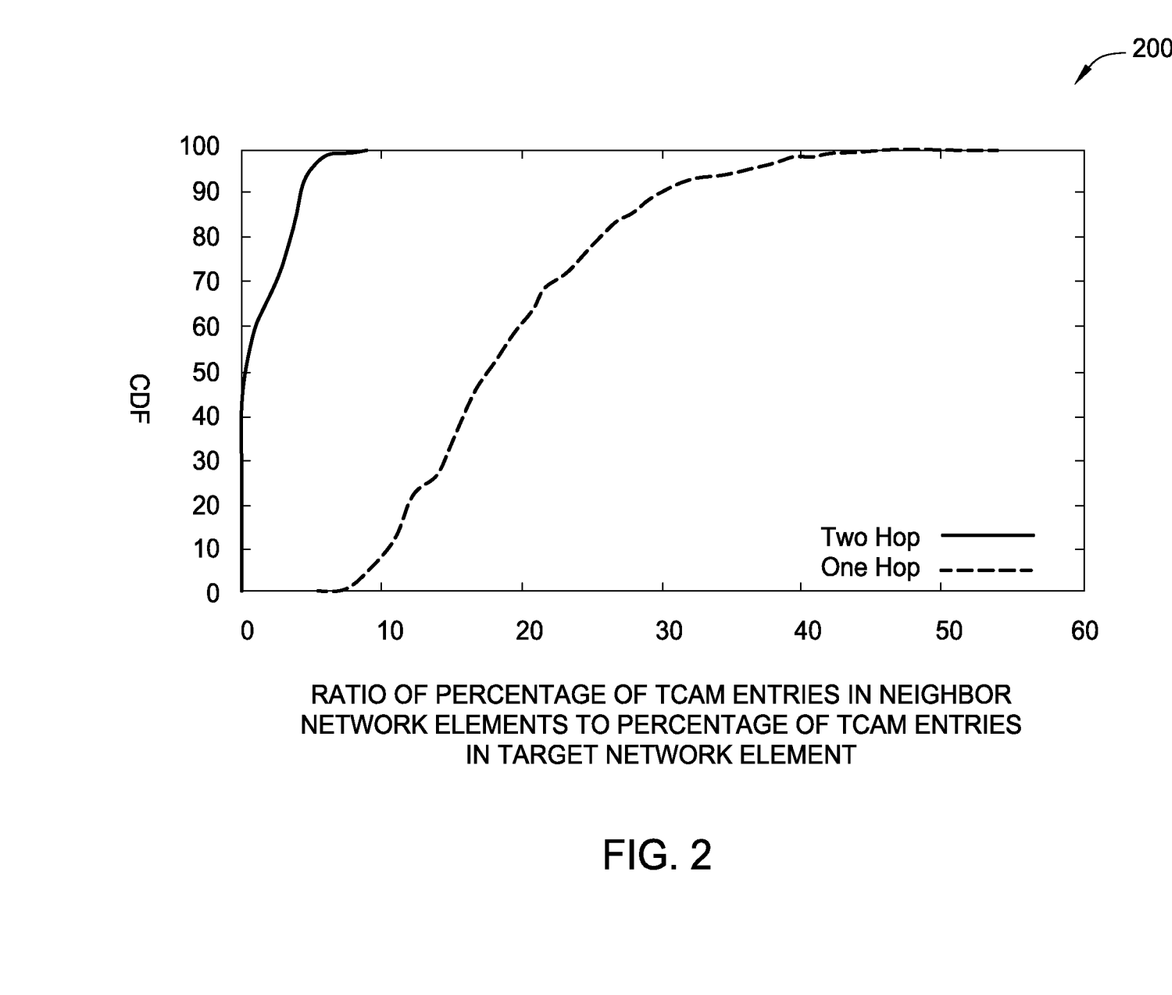
FIG. 2 depicts an exemplary Cumulative Distribution Function illustrating relatively low correlation of resource consumption in neighboring network elements of the data center network of FIG. 1.

The data center network 120 is configured to use flow deflection to handle resource-based conditions or attacks on data center network 120, thereby making data center network 120 more resilient to resource-based conditions or attacks on data center network 120. The data center network 120 is configured to use flow deflection to handle resource utilization conditions for resources of the data center network 120 (e.g., TCAM-based utilization conditions associated with TCAM resources 123 of network elements 122, CPU-based utilization conditions associated with CPU resources 124 of network elements 122, or the like), thereby making the data center network 120 more resilient to resource utilization conditions for resources of the data center network 120. It will be appreciated that an underlying assumption which may be related to use of flow deflection in data center network 120 is that (1) different network elements 122 are expected to see relatively high load at different times and, thus, when a given network element 122 is experiencing a resource utilization condition, there is a relatively good chance of identifying a neighboring network element 122 with a relatively low load that can handle additional data flows which cannot be handled by the network element 122 that is experiencing the resource utilization condition, and (2) an attack typically targets a relatively small number of network elements 122, leaving a number of neighboring network elements 122 which may be used to handle new data flows which cannot be handled by the network elements 122 targeted during the attack. The first assumption may be verified by (1) using workload data of data center network 120 to analyze and reconstruct the likely assignment of host servers 110 to network elements 122 in the data center network 120, measuring weights of pairs of host servers 110 in the same racks (e.g., based on an assumption that jobs working on the same data are likely to be assigned within the same rack), and running a graph partitioning process using the weights as inputs in order to group the VMs 112 into clusters in the same rack, (2) recognizing that the partitioning gives clusters with high fidelity and assigning each cluster of VMs 112 to an associated rack, and (3) routing the data flows between the VMs assigned to the same jobs and computing, for each target network element 122, the number of TCAM entries on the target network element 122 and the number of TCAM entries associated with each neighbor network element 122 of the target network element 122 (e.g., one-hop neighbors, one-hop and two-hop neighbors, or the like). This will be appreciated from a Cumulative Distribution Function (CDF) illustrating, for a target network element 122, the relative percentages of TCAM entries of neighbor network elements 122 (to which data flows may be deflected) to TCAM entries of the target network element 122 (from which data flows may be deflected). An exemplary CDF for a target network element 122 is depicted in FIG. 2. As depicted in FIG. 2, the exemplary CDF 200 indicates that TCAM consumption of one-hop neighbor network elements 122 of the target network element 122 is 30% or less for 90% of the one-hop neighbor network elements 122, and TCAM consumption of two-hop neighbor network elements 122 of the target network element 122 is 10% or less for all of the two-hop neighbor network elements 122. Thus, the exemplary CDF 200 indicates that there is relatively low correlation of resource consumption in neighboring network elements 122 of the data center network 120 and, thus, there is substantial room for deflection of data flows from the target network element 122 to a neighbor network element(s) 122. The second assumption is based on an expectation that, in general, more attacker resources are needed in order to target the entire networking infrastructure of the data center than are needed in order to target a small subset of the networking infrastructure of the data center.

Referring again to FIG. 1, the controller 127 is configured to use flow deflection to handle a resource utilization condition associated with a network element 122 of data center network 120 (which may or may not result from a resource utilization attack directed against the network element 122 of data center network 120).

The controller 127 monitors a network element 122 for detection of a resource utilization condition associated with the network element 122. The resource utilization condition may be a TCAM utilization condition, a CPU utilization condition, or the like. The controller 127 may monitor for detection of a TCAM utilization condition on a network element 122 by monitoring the TCAM load on the network element 122. The TCAM utilization condition for a network element 122 may be defined in any suitable manner (e.g., TCAM load greater than or equal to 70% of TCAM capacity of the network element 122, TCAM load greater than or equal to 85% of TCAM capacity of the network element 122, TCAM load greater than or equal to 95% of TCAM capacity of the network element 122, or the like). The controller 127 may monitor the network elements 122 for one of more TCAM utilization conditions (e.g., using the same TCAM utilization conditions for each of the network elements 122, using different TCAM utilization conditions for different types of network elements 122, or the like).

The controller 127 may monitor for detection of a CPU utilization condition on a network element 122 by monitoring the CPU load on the network element 122. The CPU utilization condition for a network element 122 may be defined in any suitable manner (e.g., CPU load greater than or equal to 70% of CPU capacity of the network element 122, CPU load greater than or equal to 75% of CPU capacity of the network element 122, CPU load greater than or equal to 85% of CPU capacity of the network element 122, or the like). The controller 127 may monitor the network elements 122 for one of more CPU utilization conditions (e.g., using the same CPU utilization conditions for each of the network elements 122, using different CPU utilization conditions for different types of network elements 122, or the like).

The controller 127 may, for at least some of the network elements 122, monitor the network element 122 for a TCAM utilization condition and for a CPU utilization condition.

The controller 127 may monitor the network elements 122 in any suitable manner. For example, the controller 127 may collect state information from the network elements 122 (e.g., via polling, via periodic reporting by the network elements, via event-based reporting by the network elements 122, or the like, as well as various combinations thereof). For example, the controller 127 may collect, from the network elements 122, flow statistics associated with data flows supported by the network elements 122 (e.g., where the flow statistics may include or otherwise be indicative of used/available TCAM capacity on the network elements 122, used/available CPU capacity on the network elements 122, or the like, as well as various combinations thereof).

It will be appreciated that the controller 127 may monitor some or all of the network elements 122. It will be appreciated that the controller 127 may monitor some or all of the network elements 122 for detection of the same resource utilization condition(s) of each monitored network element 122 (e.g., monitor each network element 122 for a TCAM utilization condition, monitor each network element 122 for a TCAM utilization condition and a CPU utilization condition, or the like), monitor some or all of the network elements 122 for detection of different resource utilization condition(s) of each monitored network element 122 (e.g., monitor a first network element 122 for detection of a CPU utilization condition, monitor a second network element 122 for detection of a TCAM utilization condition, monitor a third network element 122 for detection of TCAM and CPU utilization conditions, and so forth), or the like, as well as various combinations thereof. It will be appreciated that the resource utilization conditions may be defined to be the same or different across different ones of the network elements 122 for which the controller 127 performs monitoring for detecting resource utilization conditions (e.g., using a TCAM utilization threshold of 80% for some of the network elements and using a TCAM utilization threshold of 90% for others of the network elements, using a CPU utilization threshold of 85% for some of the network elements and using a CPU utilization threshold of 92% for others of the network elements, or the like). It will be appreciated that such differences in monitoring for resource utilization conditions across different network elements 122 or sets of network elements 122 may be based on one or more of network element types of the network elements 122 (e.g., top-of-rack switch versus aggregating switch, switch versus router, or the like), temporal information, traffic characteristics of traffic within the data center network 120, or the like, as well as various combinations thereof.

The controller, based on detection of a resource utilization condition on a first network element 122, initiates full flow deflection or selective flow deflection for the first network element 122. In full flow deflection, all of the new data flows received at the first network element 122 are deflected from the first network element 122. In selective flow deflection, a fraction of the new data flows received at the first network element 122 are deflected from the first network element 122. The controller 127 may perform full flow deflection or selective flow deflection for a network element 122 in response to detection of a resource utilization condition on the network element 122. For example, the controller 127 may perform full flow deflection or selective flow deflection for a network element 122 in response to detection of a TCAM utilization condition on the network element 122, detection of a CPU utilization condition on the network element 122, or detection of a TCAM utilization condition and a CPU utilization condition on the network element 122. In at least some embodiments, controller 127 is configured to use full or selective flow deflection when a TCAM utilization condition is detected for a network element 122, to use selective flow deflection when a CPU utilization condition is detected for a network element 122, and to use selective flow deflection when both TCAM and CPU utilization conditions are detected for a network element 122.

In full flow deflection and selective flow deflection, the controller 127 selects a second network element 122 to handle new flow requests on behalf of the first network element 122. The controller 127 determines a set of candidate neighbor network elements 122 which may be selected as the second network element 122 to handle new flow requests on behalf of the first network element 122. For example, the controller 127 may consider all one-hop neighbors of the first network element 122, all one-hop and two-hop neighbors of the first network element 122, or the like. The controller 127 selects the second network element 122 from the set of candidate neighbor network elements 122.

The controller 127 may select the second network element 122 from the set of candidate neighbor network elements 122 in any suitable manner.

In at least some embodiments, selection of the second network element 122 is based on the resource type for which the resource utilization condition is detected at the first network element 122 (e.g., selecting the candidate neighbor network element 122 having a lowest TCAM load when a TCAM utilization condition is detected, selecting the candidate neighbor network element 122 having a lowest CPU load when a CPU utilization condition is detected, selecting the candidate neighbor network element 122 having a lowest combined TCAM load and CPU load when both TCAM and CPU utilization conditions are detected, or the like).

In at least some embodiments, the controller selects the second network element 122 from the set of candidate neighbor network elements 122 in a manner for balancing at least a portion of the following constraints: (1) the second network element 122 has sufficient spare capacity (e.g., greater than 15% of the resource of interest is available for use at the second network element 122, greater than 20% of the resource of interest is available for use at the second network element 122, or the like), (2) the increase in the latency of the deflected data flows is held below a threshold or even minimized; (3) the increase in network bandwidth within the data center network due to flow deflection is held below a threshold or even minimized, (4) correlation of traffic patterns of the first network element 122 and the second network element 122 is below a threshold or even zero, and (5) a probability that the second network element 122 is used for flow deflection by one or more other network elements 122 is below a threshold. It will be appreciated that, in at least some embodiments, an optimization problem accounting for some or all of the above-described constraints is solved in order to select the second network element 122 for handling data flows deflected by the first network element 122 (e.g., where a goal of the optimization problem may be to determine a desired or optimal solution in utilizing the associated resources of interest of all of the network elements 122 versus balancing the overhead of extending the data flows). It also will be appreciated that the use of this or similar selection capabilities alleviates the potential drawbacks of using flow deflection (e.g., increase in latency of the deflected flows, increase in consumption of network bandwidth of the data center network, or the like).

The controller 127 generates a flow forwarding rule for the first network element 122, where the flow forwarding rule is configure to instruct the first network element 122 to propagate new flow requests to the second network element 122 selected by the controller 127 (rather than to the controller 127) such that the second network element 122 will forward new flow requests received at the first network element 122 to the controller 127 on behalf of the first network element 122.

In at least some embodiments, when full flow deflection is used, the flow forwarding rule is indicative that all new flow requests received at the first network element 122 are to be forwarded from the first network element 122 to the second network element 122.

In at least some embodiments, when selective flow deflection is used, the flow forwarding rule is indicative that a fraction of the new flow requests received at the first network element 122 are to be forwarded from the first network element 122 to the second network element 122 (while the remaining fraction of new flow requests received at the first network element 122 are to be handled locally by the first network element 122). The fraction of the new data flows received at the first network element 122 that are deflected to the second network element 122 may be selected in any suitable manner (e.g., based on the type of resource for which the utilization condition is detected at the first network element 122, based on the level of utilization of the resource of interest at the first network element 122, or the like). For example, the fraction may be 30% when the resource utilization is 70%, the fraction may be 40% when the resource utilization is 90%, or the like. The control over the fraction of the new data flows received at the first network element 122 that are deflected to the second network element 122 (e.g., in order to achieve deflection of the desired or required fraction of data flows) may be achieved in any suitable manner (e.g., based on flow definitions of data flows). In at least some embodiments, random bits from the flow header (e.g., source prefixes or other portions of the flow header) may be selected as the basis for determining which flows to deflect from the first network element 122 to the second network element 122 and which flows to handle locally at the first network element 122. In at least some embodiments, selection of the bits used to the deflection fraction may be dynamic so as to make it more difficult for potential attackers to determine the basis for selective flow deflection. In at least some embodiments, control over the fraction of the new data flows received at the first network element 122 that are deflected to the second network element 122 may be based on prefixes of addresses of the data flows (e.g., Internet Protocol (IP) addressed, Media Access Control (MAC) addresses, or the like), the protocols of the data flows (e.g., Hypertext Transfer Protocol (HTTP), HTTP Secure (HTTPS), File Transfer Protocol (FTP), or the like), port numbers of the data flows, or the like, as well as various combinations thereof.

The controller 127 propagates the flow forwarding rule to the first network element 122. The first network element 122 receives the flow forwarding rule generated by the controller 127 and stores the flow forwarding rule. The first network element 122 uses the flow forwarding rule to forward new flow requests to the second network element 122 selected by the controller 127. It is noted that new flow requests are new flow requests for which the first network element 122 is the first network element of the SDN that receives the new flow request. For example, for a data flow originating from one of the VMs 112 of one of the host servers 110 of data center 102, the ToR switch $122_T$ with which the one of the host servers 110 is associated is the first network element of the SDN to receive the new flow request for the data flow. For example, for a data flow originating from a device outside of data center 102 and intended for one of the VMs 110 of one of the host servers 110 of the data center 102, the router $122_R$ which is the entry point to the data center network 120 is the first network element of the SDN to receive the new flow request for the data flow. The new flow request may be in the form of the first packet of the data flow, a data flow request message, or the like.

In at least some embodiments, when the flow forwarding rule is for full flow deflection, the first network element 122, based on reception of a request for a new data flow at the first network element 122, forwards a new flow request for the new data flow to the second network element 122 (rather than to the controller 127) in accordance with the flow forwarding rule installed on the first network element 122 by the controller 127.

In at least some embodiments, when the flow forwarding rule is for selective flow deflection, the first network element 122, based on reception of a request for a new data flow at the first network element 122, determines whether the new data flow of the new flow request is to be handled locally or deflected to the second network element 122. As noted above, the determination as to whether the new data flow of the new flow request is to be handled locally or deflected to the second network element 122 may be made based on the flow definition of the data flow (e.g., random bits from the flow header, address information, protocol, port number information, or the like). The first network element 122, based on a determination that the new flow request is to be deflected to the second network element 122, forwards the new flow request for the new flow to the second network element 122 (rather than to the controller 127) in accordance with the flow forwarding rule installed on the first network element 122 by the controller 127. The first network element 122, based on a determination that the new flow request is not to be deflected to the second network element 122, forwards the new flow request for the new flow to the controller 127 (rather than to the second network element 122).

The second network element 122 receives the new flow request from the first network element 122 and, based on a determination by the second network element 122 that the new flow request is associated with a new data flow that is not currently supported by the second network element 122 (e.g., based on a lookup in the forwarding table of the second network element 122), forwards the new flow request to the controller 127.

The controller 127 receives the new flow request of the first network element 122 from the second network element 122 and processes the new flow request of the first network element 122 as if the new flow request of the first switch is a new flow request of the second network element 122 (e.g., by determining a path for the new data flow and installing forwarding rules for the data path of the new data flow on each of the network elements 122 selected by controller 127 for inclusion in the data path for the new data flow).

In at least some embodiments, a flow identifier may be associated with the new flow request that is forwarded from the first network element 122 to the second network element 122. The flow identifier may be added, by the first network element 122, to the new flow request that is sent from the first network element 122 to the second network element 122. The flow identifier may be associated with the new flow by the second network element 122 (e.g., by assigning a flow identifier for the data flow and associating the flow identifier with the data flow information stored at the second network element 122 for the data flow). The flow identifier may be used by the second network element 122 to distinguish the new flow request that is received from the first network element 122 as part of flow deflection from local data flows of the second network element (e.g., data flows for data flow requests received at the second switch without use of flow deflection). The second network element 122 may be configured to give local data flows higher priority than deflected data flows under certain conditions (e.g., when the second network element 122 experiences a TCAM utilization condition, when the second network element 122 experiences a CPU utilization condition, or the like). The flow identifier may be implemented using a Multiprotocol Label Switching (MPLS) label (e.g., MPLS label handling has been supported by OpenFlow since OpenFlow 1.1), a Virtual Local Area Network (VLAN) Identifier, or any other suitable type of identifier.

It will be appreciated that the new flow request may be a first packet of the new flow (e.g., as described with respect to establishment of data flows in an OpenFlow network) or any other suitable type of new flow request message.

It will be appreciated that the foregoing description assumes, for purposes of clarity, that the second network element 122 is a one-hop neighbor of the first network element 122. When the second network element 122 is not a one-hop neighbor of the first network element 122, but, rather, is separated from the first network element 122 by one or more intermediate network elements 122, the controller 127 generates a flow forwarding rule(s) for each intermediate network element(s) 122 and forwards the flow forwarding rule(s) to the intermediate network element(s) 122 such that new flow requests of the first network element 122 can be propagated to the second network element 122 via the intermediate network element(s) 122. For example, where the second network element 122 is a two-hop neighbor of the first network element 122 and an intermediate network element 122 is selected to support flow deflection from the first network element 122 to the second network element 122, controller 127 sends a first flow forwarding rule to the first network element 122 (e.g., instructing the first network element 122 to forward, to the intermediate network element 122, new flow requests received at the first network element 122) and sends a second flow forwarding rule to the intermediate network element 122 (e.g., instructing the intermediate network element 122 to forward, to the second network element 122, new flow requests received at the intermediate network element 122 from the first network element 122).

It will be appreciated that use of selective flow deflection enables new data flows to be deflected to multiple network elements 122. The controller 127 may select multiple neighbor network elements 122, generate multiple deflection rules for the multiple neighbor network elements 122, and install the multiple deflection rules on the first network element 122. The selection of the multiple neighbor network elements 122 may be performed in any suitable manner (e.g., generating a single list of candidate neighbor network elements 122 and selecting the multiple neighbor network elements 122 from the list of candidate neighbor network elements 122, generating multiple lists of candidate neighbor network elements 122 and selecting the multiple neighbor network elements 122 from the multiple lists of candidate neighbor network elements 122, or the like).

It will be appreciated that the data path computed by the controller 127 for the new data flow may or may not include the first network element 122. It is expected that, in a well-connected network, the controller 127 will be able to identify a path for the new data flow that does not include the first network element 122 (or any other network element 122 that may be experiencing a resource utilization condition). However, in a network that is not well-connected or even in certain instances in a well-connected network, the controller 127 may determine that the data path must or should traverse the first network element 122 (or, as noted above, any other network element 122 that may be experiencing a resource utilization condition). In at least some embodiments, in which the data path computed for the new data flow includes a network element 122 experiencing a resource utilization condition, a tunnel or tunnels (e.g., one or more MPLS tunnels or any other suitable type(s) of tunnel(s)) may be configured in order to enable the traffic of the data flow to pass through the network element 122 experiencing the resource utilization condition.

It will be appreciated that, while flow deflection expands the amount of resources available to be shared for handling additional load, this expansion of the amount of available resources may come at the expense of increased path length of the data paths computed and used for deflected flows. In at least some embodiments, the controller 127 may be configured to balance such competing interests.

The controller 127 is configured to continue to monitor the first network element 122 for determining when flow deflection at the first network element 122 can be removed and to initiate removal of flow deflection at the first network element 122 based on a determination that flow deflection at the first network element 122 can be removed.

The determination that flow deflection at the first network element 122 can be removed may be based on a determination that the resource utilization condition is no longer present on the first network element 122 (e.g., the TCAM utilization on the first network element 122 drops below the threshold used to initiate flow deflection, the CPU utilization on the first network element 122 drops below the threshold used to initiate flow deflection, or the like).

The determination that flow deflection at the first network element 122 can be removed may be based on a determination that a different resource utilization condition is satisfied at the first network element 122. For example, where flow deflection was initiated at the first network element 122 based on a determination that TCAM utilization at the first network element 122 exceeded 85%, flow deflection may be removed at the first network element 122 based on a determination that TCAM utilization at the first network element 122 drops below 80%. For example, where flow deflection was initiated at the first network element 122 based on a determination that CPU utilization at the first network element 122 exceeded 92%, flow deflection may be removed at the first network element 122 based on a determination that CPU utilization at the first network element 122 drops below 88%. It will be appreciated that the conditions may be defined in various other ways.

The determination that flow deflection at the first network element 122 can be removed may be based on a determination that, for each resource type that is monitored, the resource utilization of the resource type satisfies an associated resource condition (e.g., TCAM utilization below a TCAM utilization threshold, CPU utilization below a CPU utilization threshold, or the like, as well as various combinations thereof).

It will be appreciated that the determination that flow deflection at the first network element 122 can be removed may be based on any other suitable type(s) of condition(s).

The controller 127 initiates removal of flow deflection at the first network element 122. It will be appreciated that removal of flow deflection does not only include removal of the flow forwarding rule, because removal of the flow forwarding rule from the first network element 122 without migrating the deflected flows back from the second network element 122 to the first network element 122 may lead to a burst of flow setup requests which will burden the CPU resources 124 of the first network element 122.

The controller 127 may initiate removal of flow deflection at the first network element 122 by migrating the deflected flows from the second network element 122 back to the first network element 122. For example, the controller 127 may be configured, for each data flow deflected from the first network element 122 to the second network element 122, to setup new paths from the first network element 122 to the destination, change the deflected flows to be forwarded on the new paths associated with the first network element 122 rather than on the previous paths associated with the second network element 122, and then remove the previous paths from the second network element 122 to the destination. The controller 127 may then prevent use of the flow forwarding rule at the first network element 122 after the deflected flows have been migrated from the second network element 122 back to the first network element 122. In at least some situations, however, this process may result in significant overhead (e.g., due to path setup) or may cause out-of-order packet delivery for the deflected data flows.

The controller 127 may initiate removal of flow deflection at the first network element 122 by keeping the data paths of the deflected flows unchanged while ensuring that new data flows received at the first network element 122 are no longer deflected from the first network element 122 to the second network element 122. For example, controller 127 may be configured to (1) generate, for each deflected flow, an explicit rule that packets of the flow are to be forwarded from the first network element 122 to the second network element 122, thereby ensuring that the deflected flows still are able to reach the second network element 122 without relying on the flow forwarding rule that was installed on the first network element 122 when flow deflection was initiated and (2) after the explicit rules for the deflected flows have been set on the first network element 122, remove the flow forwarding rule that was installed on the first network element 122 when flow deflection was initiated, thereby ensuring that new data flows are sent from the first network element 122 to the controller 127 rather than to the second network element 122. In this embodiment, the deflected data flows continue to use the deflection paths until the deflected data flows are terminated.

The controller 127 may prevent use of the flow forwarding rule at the first network element 122 by propagating, to the first network element 122, a message configured to instruct the first network element to discontinue use of the flow forwarding rule at the first network element 122 (e.g., by removing the flow forwarding rule from the first network element 122, by marking the flow forwarding rule as inactive at the first network element 122, or the like).

The controller 127 may initiate removal of flow deflection at the first network element 122 in response to any other suitable conditions (e.g., after a threshold length of time since initiation of flow deflection, based on overall network traffic loads, or the like).

As a result of the flow deflection performed by the first network element 122 in response to detection of the resource utilization condition on the first network element 122, resources of the second network element 122 (e.g., TCAM resources 123 and CPU resources 124), not the first network element 122, are consumed in requesting and supporting the data path for the new data flow. This enables new data flows received at the first network element 122 to be supported where a resource utilization condition (e.g., a resource over-utilization condition or a resource exhaustion condition) on the first network element 122 may have otherwise prevented new data flows of the first network element 122 from being supported.

Figure 3:
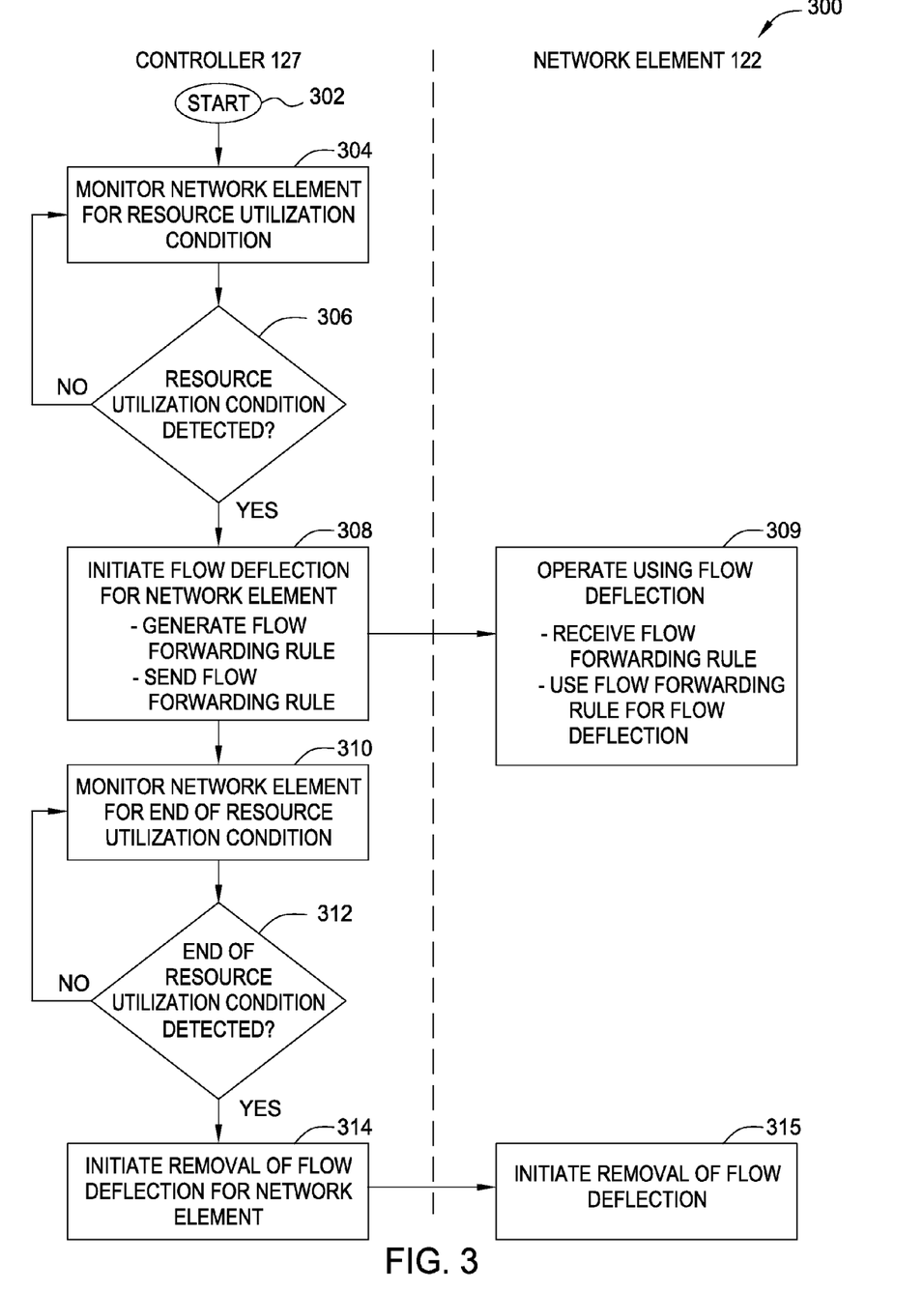
FIG. 3 depicts one embodiment of a method for using flow deflection at a network element in response to detecting a resource utilization condition at the network element.

FIG. 3 depicts one embodiment of a method for using flow deflection at a network element in response to detecting a resource utilization condition at the network element. As depicted in FIG. 3, a portion of the steps of method 300 are performed by a controller (e.g., controller 127) and a portion of the steps of method 300 are performed by a network element (e.g., a network element 122). The various steps of method 300 may be better understood when considered in conjunction with the description of FIG. 1.

At step 302, method 300 begins.

At step 304, the controller monitors the network element for a resource utilization condition.

At step 306, the controller determines whether a resource utilization condition is detected. If a resource utilization condition is not detected, method 300 returns to step 304 (e.g., the controller continues to monitor the network element for detection of a resource utilization condition). If a resource utilization condition is detected, method 300 proceeds to step 308.

At step 308, the controller initiates flow deflection for the network element. In at least some embodiments, initiation of flow detection by the controller includes generation of a flow forwarding rule for the network element, propagation of the flow forwarding rule from the controller to the network element, or the like. From step 308, method 300 proceeds to step 309 (performed by the network element) and also proceeds to step 310 (performed by the controller).

At step 309, the network element operates using flow deflection. In at least some embodiments, operation of the network element using flow deflection includes receiving the flow forwarding rule, using the flow forwarding rule for flow deflection at the network element, or the like. As depicted in FIG. 3, the network element remains at step 309 until receiving from the controller an indication that flow deflection is to be removed (although method 300 continues on the controller for detecting the end of the resource utilization condition at the network element such that the flow deflection is to be removed).

At step 310, the controller monitors the network element for the end of the resource utilization condition.

At step 312, the controller determines whether the end of the resource utilization condition is detected. If the end of the resource utilization condition is not detected, method 300 returns to step 310 (e.g., the controller continues to monitor the network element for detection of the end of the resource utilization condition). If the end of the resource utilization condition is detected, method 300 proceeds to step 314.

At step 314, the controller initiates removal of flow deflection for the network element. For example, initiation of removal of flow detection by the controller may include instructing the network element from which the data flows were deflected not to deflect new data flows, instructing a network element(s) to migrate deflected data flows back to the network element from which the data flows were deflected, or the like. From step 308, method 300 proceeds to step 315 (performed by the network element).

At step 315, the network element initiates removal of flow deflection. The initiation of the removal of flow deflection may include initiating a process to migrate deflected flows back to the network element, initiating a process to ensure that subsequent data flows are processed locally rather than deflected (e.g., by removing the flow forwarding rule), or the like.

It will be appreciated that method 300 represents one cycle of applying and removing flow deflection at a single network element for a single resource utilization condition. It will be appreciated that method 300 may continue to be performed by the controller and the network element for other resource utilization conditions experienced by the network element. It also will be appreciated that method 300 may be performed by the controller and multiple network elements for which the controller provides flow deflection capabilities.

It will be appreciated that, although primarily depicted and described herein with respect to embodiments in which monitoring for resource-based conditions, detection of resource-based conditions, and generation of flow forwarding rules based on detection of resource-based conditions is performed by the controller of the SDN, in at least some embodiments one or more of these functions may be performed by one or more other devices. In at least some embodiments, the network elements may be configured to monitor for resource-based conditions, detect resource-based conditions, and generate flow forwarding rules based on detection of resource-based conditions (e.g., where a network element monitors utilization of its own resource or resources and, when a resource-based condition is detected, generates and stores a flow forwarding rule for local use at the network element). In at least some embodiments, a device or agent of the SDN (other than the controller of the SDN and the network elements of the SDN) may be configured to monitor for resource-based conditions, detect resource-based conditions, and generation of flow forwarding rules based on detection of resource-based conditions. In at least some embodiments, a device outside of the SDN may be configured to monitor for resource-based conditions, detect resource-based conditions, and generation of flow forwarding rules based on detection of resource-based conditions. It will be appreciated that various combinations of such embodiments may be used (e.g., where certain ones of the network elements perform the functions themselves while the functions or performed by the controller for others of the network elements). It will be appreciated that these functions may be implemented in various other ways.

It will be appreciated that, although primarily depicted and described herein with respect to embodiments in which OpenFlow is used to control path selection and setup within the SDN, any other suitable control protocol may be used to control path selection and setup within the SDN.

It will be appreciated that, although primarily depicted and described herein with respect to embodiments in which the SDN is used to provide a data center network, the SDN may be used to provide any other suitable type of network.

It will be appreciated that, although primarily depicted and described herein with respect to embodiments in which flow deflection is used within a specific type of distributed network in which control plane functions and forwarding plane functions are separated (namely, an SDN), flow deflection may be used within any other suitable type of distributed network in which control plane functions and forwarding plane functions are separated.

Figure 4:
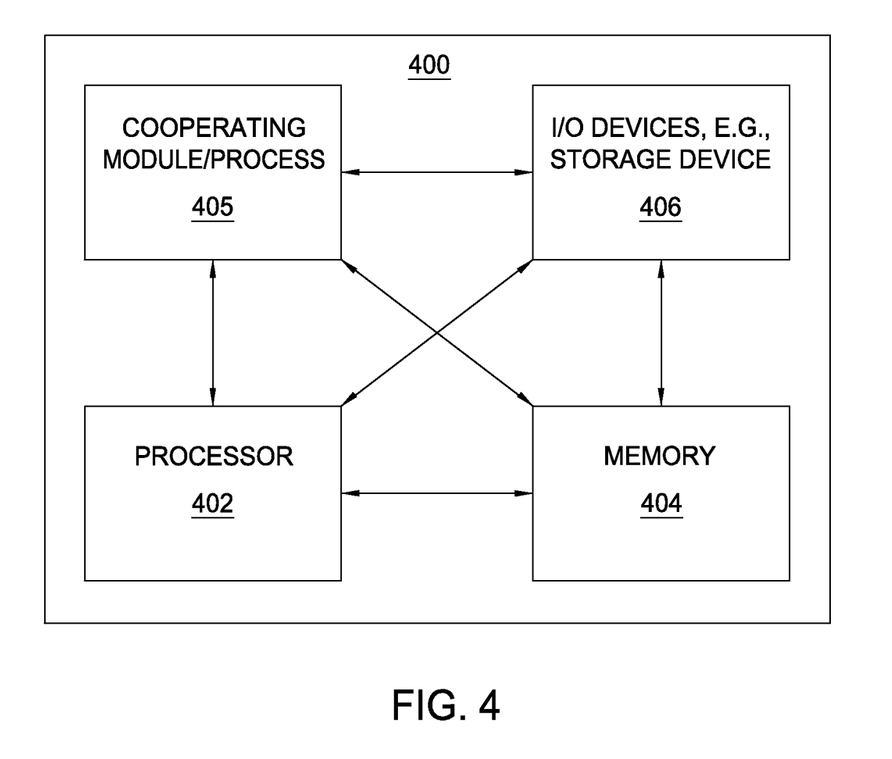
FIG. 4 depicts a high-level block diagram of a computer suitable for use in performing functions described herein.

FIG. 4 depicts a high-level block diagram of a computer suitable for use in performing functions described herein.

The computer 400 includes a processor 402 (e.g., a central processing unit (CPU) and/or other suitable processor(s)) and a memory 404 (e.g., random access memory (RAM), read only memory (ROM), and the like).

The computer 400 also may include a cooperating module/process 405. The cooperating process 405 can be loaded into memory 404 and executed by the processor 402 to implement functions as discussed herein and, thus, cooperating process 405 (including associated data structures) can be stored on a computer readable storage medium, e.g., RAM memory, magnetic or optical drive or diskette, and the like.

The computer 400 also may include one or more input/output devices 406 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 400 depicted in FIG. 4 provides a general architecture and functionality suitable for implementing functional elements described herein and/or portions of functional elements described herein. For example, the computer 400 provides a general architecture and functionality suitable for implementing one or more of a host server 110, a portion of a host server 110, a ToR switch $122_T$, a portion of a ToR switch $122_T$, an aggregating switch $122_A$, a portion of an aggregating switch $122_A$, a router $122_R$, a portion of a router $122_R$, controller 127, a portion of controller 127, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the method steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
generate, based on detection of a resource utilization condition associated with a first network element of a software defined network, a flow forwarding rule indicative that at least a portion of new flow requests received at the first network element are to be forwarded from the first network element to a second network element of the software defined network.

2. The apparatus of claim 1, wherein the resource utilization condition comprises a Ternary Content-Addressable Memory (TCAM) utilization condition or a Central Processing Unit (CPU) utilization condition.

3. The apparatus of claim 1, wherein the processor is configured to:
select the second network element from a set of candidate network elements.

4. The apparatus of claim 3, wherein the resource utilization condition is associated with a resource type, wherein the second network element is one of the candidate network elements having a lowest resource utilization level for the resource type.

5. The apparatus of claim 3, wherein the set of candidate network elements comprises at least one of:
one or more one-hop neighbors of the first network element; or
one or more two-hop neighbors of the first network element.

6. The apparatus of claim 1, wherein the flow forwarding rule is indicative that each new flow request received at the first network element is to be forwarded from the first network element to the second network element.

7. The apparatus of claim 1, wherein the flow forwarding rule is indicative that a fraction of new flow requests received at the first network element are to be forwarded from the first network element to the second network element.

8. The apparatus of claim 7, wherein the processor is configured to condition the fraction on flow definition information associated with data flows.

9. The apparatus of claim 1, wherein the processor is configured to:
initiate migration of deflected data flows, deflected from the first network element to the second network element based on the flow forwarding rule, from the second network element to the first network element; and
generate, based on a determination that data flows deflected have been migrated from the second network element back to the first network element, a message for preventing use of the flow forwarding rule at the first network element.

10. The apparatus of claim 1, wherein the processor is configured to:
generate, for each deflected data flow deflected from the first network element to the second network element based on the flow forwarding rule, a flow rule indicative that data packets of the deflected data flow are to be forwarded from the first network element to the second network element; and
generate a message for instructing the first network element to discontinue use of the flow forwarding rule at the first network element.

11. A method, comprising:
using a processor for:
generating, based on detection of a resource utilization condition associated with a first network element of a software defined network, a flow forwarding rule indicative that at least a portion of new flow requests received at the first network element are to be forwarded from the first network element to a second network element of the software defined network.

12. An apparatus, comprising:
a processor and a memory communicatively connected to the processor, the processor configured to:
receive a new flow request at a first network element of a software defined network; and forward the new flow request from the first network element toward a second network of the software defined network based on a flow forwarding rule indicative that at least a portion of new flow requests received at the first network element are to be forwarded from the first network element to the second network element.

13. The apparatus of claim 12, wherein the processor is configured to perform at least one of:
receive the flow forwarding rule at the first network element from a control element of the software defined network based on a detection of a resource utilization condition associated with the first network element; or
generate the flow forwarding rule for the first network element based on a detection of a resource utilization condition associated with the first network element.

14. The apparatus of claim 13, wherein the resource utilization condition comprises a Ternary Content-Addressable Memory (TCAM) utilization condition or a Central Processing Unit (CPU) utilization condition.

15. The apparatus of claim 12, wherein the flow forwarding rule is indicative that each new flow requests received at the first network element is to be forwarded from the first network element to the second network element.

16. The apparatus of claim 12, wherein the flow forwarding rule is indicative that a fraction of new flow requests received at the first network element are to be forwarded from the first network element to the second network element.

17. The apparatus of claim 16, wherein the processor is configured to:
determine, based on the flow forwarding rule and flow information associated with the new flow request, whether the new flow request is to be forwarded to the second network element.

18. The apparatus of claim 12, wherein the processor is configured to:
associate a flow identifier with the new flow request, the flow identifier for use by the second network element to distinguish a data flow associated with the new flow request from data flows associated with data flow requests received at the second network element.

19. The apparatus of claim 12, wherein the processor is configured to:
receive a message for instructing the first network element to discontinue use of the flow forwarding rule at the first network element; and
discontinue use of the flow forwarding rule for new data flow requests received at the first network element.

20. A method, comprising:
using a processor for:
receiving a new flow request at a first network element of a software defined network; and
forwarding the new flow request from the first network element toward a second network of the software defined network based on a flow forwarding rule indicative that at least a portion of new flow requests received at the first network element are to be forwarded from the first network element to the second network element.

* * * * *